United States Patent [19]

Leczycki

[11] 4,083,587
[45] Apr. 11, 1978

[54] SPLIT-RING TYPE PIPE COUPLINGS

[75] Inventor: Moshe Leczycki, Tel Aviv, Israel

[73] Assignee: Plasson Maagan Michael Industries Ltd., Menashe, Israel

[21] Appl. No.: 786,808

[22] Filed: Apr. 12, 1977

Related U.S. Application Data

[63] Continuation-in-part of Ser. No. 618,281, Sep. 30, 1975, Pat. No. 4,025,093.

[30] Foreign Application Priority Data

May 14, 1976 Israel .................................. 49577

[51] Int. Cl.² .......................................... F16L 21/04
[52] U.S. Cl. .................................. 285/343; 285/348; 285/354; 285/382.7
[58] Field of Search ................... 285/343, 382.7, 249, 285/323, 348, 354, 146, 423, 322

[56] References Cited

U.S. PATENT DOCUMENTS

| 433,489 | 8/1890 | Potts | 285/343 |
|---|---|---|---|
| 2,120,275 | 6/1938 | Cowles | 285/323 X |
| 2,412,664 | 12/1964 | Wolfram et al. | 285/343 |
| 2,452,278 | 10/1948 | Woodling | 285/343 |
| 2,683,047 | 7/1954 | Allen | 285/146 |
| 2,727,761 | 12/1955 | Elliott et al. | 285/316 X |
| 3,380,765 | 4/1968 | Himmel | 285/382.7 X |
| 3,563,575 | 2/1971 | Sanford | 285/343 X |
| 3,743,326 | 7/1973 | Courtot et al. | 285/382.7 X |
| 3,815,940 | 6/1974 | Luckenbill | 285/323 |
| 3,888,523 | 6/1975 | Bartholomew | 285/382 |

Primary Examiner—Thomas F. Callaghan
Attorney, Agent, or Firm—Benjamin J. Barish

[57] ABSTRACT

A pipe coupling is described comprising a split-ring having an outer conical surface defined by the top lands of a plurality of circumferentially-spaced axially-extending ribs, the higher end of each rib being formed with an outwardly-projecting step. The coupling further includes a sleeve formed with an internal conical surface engageable with the outer conical ribs of the split-ring to cause the ring to tightly clamp the pipe within the housing, the sleeve further including an internal annular shoulder engageable with the outwardly-projecting steps of the split-ring converting tensile stresses in the split-ring to shear stresses.

3 Claims, 5 Drawing Figures

SPLIT-RING TYPE PIPE COUPLINGS

RELATED APPLICATIONS

The present application is for a Continuation-In-Part to my copending Patent Application Ser. No. 618,281 filed Sept. 30, 1975 now U.S. Pat. No. 4,025,093.

BACKGROUND OF THE INVENTION

The present invention relates to pipe couplings of the split-ring type, and is particularly directed to an improvement in the pipe coupling described in my copending Patent Application Ser. No. 618,281.

The above-cited Patent Application Ser. No. 618,281 describes a pipe coupling comprising a housing formed with external threads and with an internal axial bore for receiving one end of a pipe; a one-piece split-ring of hard elastic material for application around the pipe to be received in the bore of the housing, the split-ring having an outer tapered surface and an inner surface formed with annular teeth; and a sleeve formed at one end with threads cooperable with the threads of the housing, and formed at the opposite end with an internal conical surface engageable with the outer tapered surface of the split-ring to cause the split-ring to tightly clamp the pipe upon threading the sleeve onto the housing. An important feature in that pipe coupling is that the split-ring includes a plurality of circumferentially-spaced, axially-extending ribs of increasing height, the outer tapered surface of the split-ring being defined by the top lands of the ribs. This construction imparts sufficient axial elasticity to the split-ring to enable it to be opened widely along the split and to be applied in a radial direction to the pipe after the latter has been inserted into the bore of the housing.

BRIEF SUMMARY OF THE PRESENT INVENTION

According to the improvement of the present invention, the higher end of each rib in the split-ring is formed with an outwardly-projecting step, and in addition, the sleeve is formed with an intermediate internal annular shoulderengageable with all the outwardly-projecting steps of the ribs when the sleeve is threaded onto the housing. Whereas in the construction of the parent application a force tending to pull out the pipe from the coupling creates tensile stresses in the split-ring, in the improved arrangement of the present application, the outwardly-projecting steps of the split-ring act against the internal shoulder of the sleeve to create shear stresses instead, which shear stresses are better resisted by the split-ring than tensile stresses.

BRIEF DESCRIPTION OF THE DRAWINGS

In order to facilitate understanding the improvement of the present application, the pipe coupling described in the above-cited parent application is illustrated in FIGS. 1-4 of the accompanying drawings, and the improvement of the present application is illustrated in FIG. 5. More particularly.

DETAILED DESCRIPTION OF THE DRAWINGS

Figure 1:
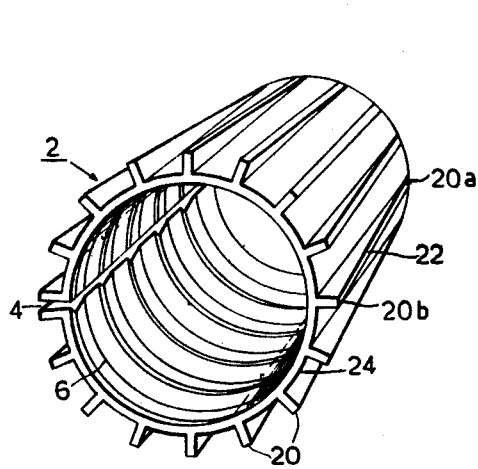
FIG. 1 is a perspective view of a split-ring constructed in accordance with the invention of the parent application.

With reference first to FIG. 1, the split-ring illustrated is generally designated 2 and is formed as a single unitary member of hard elastic material, such as polyacetal resin, having a slit 4 parallel to the longitudinal axis of the ring. As known, the inner face of split-ring 2 is formed with a plurality of annular teeth 6 for gripping the pipe to be clamped by the coupling, and its outer face is formed with a tapered or conical surface cooperable with the internal conical surface of the coupling sleeve threaded onto the coupling housing.

Figure 2:
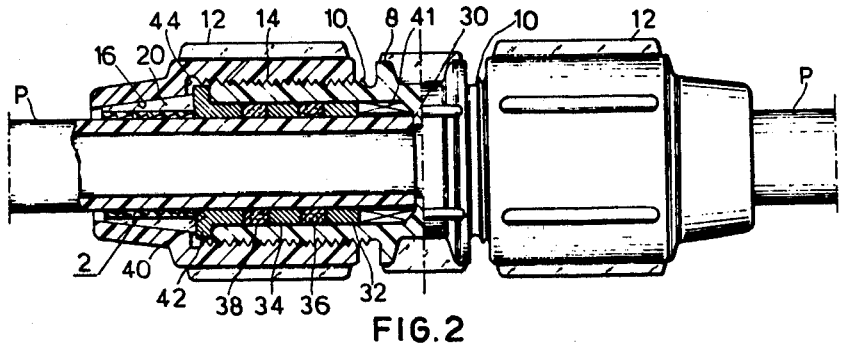
FIG. 2 is a side elevational view, partly in section, of an in-line pipe coupling including the split-ring of FIG. 1.

FIG. 2 illustrates the essential parts of the coupling assembled on the pipe P. These parts include: the split-ring 2 of FIG. 1; the coupling housing 8 formed with external threads 10; and the coupling sleeve 12 formed with internal threads 14 at one end cooperable with threads 10 of the housing, and formed at the opposite end with an internal conical surface 16 engagable with the outer tapered surface of the split-ring to cause it to tightly clamp the pipe P upon threading of the sleeve into the housing.

Split-ring 2 is constituted of a substantially cylindrical wall having the longitudinal slit 4 and is formed on its outer surface with a plurality of circumferentially-spaced axially-extending ribs 20, the height of the ribs uniformly increasing from one end 20a to the opposite end 20b. This arrangement produces an outer tapered surface define by the top lands or surfaces 22 of the ribs 20. The bottom lands 24 of the ribs, namely the circumferential spacing between adjacent ribs, are of substantially greater width than the width of the ribs and are parallel to the longitudinal axis of the split-ring; they may be formed with a slight taper particularly at end 20a.

Such a construction substantially increases the elasticity of the split-ring and facilitates the attachment of the coupling to a pipe as described in the above-cited parent application.

The complete coupling illustrated in FIG. 2 is an inline type for coupling two pipes P together. Accordingly, the coupling housing 8 is formed with two in-line axial bores separated by an internal shoulder 30, each bore receiving one of the pipes P and the other elements of the coupling for clamping them together within the housing bore.

Thus, with respect to the left end of the coupling illustrated in FIG. 2, the coupling includes the previously mentioned split-ring 2 (of FIG. 1), and the sleeve 12 threadedly received at one end on housing 8 and formed at the opposite end with the internal conical surface 16 engaging the split-ring 2. In addition, the coupling includes a pair of annular spacer rings 32 and 34, a pair of sealing rings 36 and 38, and an end bushing 40. In the assembled condition of the coupling on the pipe as shown in FIG. 2, the inner spacer ring 32 abuts against the end of a plurality of axially-extending ribs 41 formed within the bore of the housing adjacent to its internal shoulder 30. Next appear sealing ring 36, spacer ring 34, sealing ring 38, and finally the annular bushing 40 against sealing ring 38. Bushing 40 is formed with an out-turned rim 42, the outer face of which is engaged by the split-ring 2 to firmly press the inner face of the bushing against the end face of housing 8. In addition, sleeve 12 is formed with an internal step or shoulder 44, for a purpose to be described below, between its threaded portion 14 and its conical portion 16.

As described in the above-cited parent application, considerable difficulty is frequently experienced with respect to the existing split-ring couplings when manually inserting the pipe into the axial bore formed within the coupling housing 8. The normal procedure for attaching the existing coupling to the pipe is first to pass the end of the pipe through the split-ring (the smaller diameter of the split-ring facing inwardly), and then to pass the end of the pipe into the housing bore until the pipe end abuts the internal shoulder (e.g., 30) of the bore. The sealing rings in some cases are disposed within the housing bore in annular recesses formed therein, and in other cases are applied to the end of the pipe inserted into the bore. In either case, however, the sealing ring imposes a considerable resistance to the manual insertion of the pipe into the bore end, particularly with respect to large-diameter pipes.

An important advantage in the construction of the split-ring 2 illustrated in FIG. 1 is that, because of its substantially increased elasticity, it greatly facilitates the manual insertion of the pipe into the housing bore, by the following procedure:

First, the end of pipe P is passed through sleeve 12, bushing 40, sealing ring 38, spacer ring 34, sealing ring 36, and spacer ring 32, in that order as illustrated in FIG. 2, except that the split-ring 2 is not applied to the pipe at this stage. The end of the pipe is then inserted into the open end of the bore within housing 8, and sleeve 12 is tightened by its threads 14 engaging threads 10 of the housing to move the pipe, with the above elements assembled thereon, into the housing bore. During this tightning of sleeve 12, its internal shoulder 44 engages the outer face of the out-turned rim 42 of bushing 40, pressing it, as well as the end of the pipe and the other elements thereon, inwardly of the housing bore until the end spacer ring 32 firmly abuts against the internal ribs 41 of the housing. Then sleeve 12 is unthreaded and removed from the housing; split-ring 2 is spread apart (this being permitted by the highly elastic structure of the split-ring as illustrated in FIG. 1) until it snaps into place around the pipe; and sleeve 12 is threaded back onto housing 8 to bring conical surface 16 of the sleeve against the outer tapered face (defined by the top lands 20b of ribs 20 as described above) until the end of the split-ring firmly abuts against the out-turned rim 42 of bushing 40 with the teeth 6 on the inner face of the split-ring biting into the pipe P.

Thus, whereas in the previous pipe couplings of the type described, the split-ring is first applied axially through the end of the pipe and then the pipe and split-ring are inserted together into the housing (this procedure being required because of the relatively low elasticity of the split-ring), in the above-described construction of the above-cited parent application, split ring (because of its highly elastic construction) may be applied radially to the pipe after the latter has already been inserted into the housing bore with the aid of the threaded sleeve 12 and the mechanical advantage provided thereby.

Figure 3:
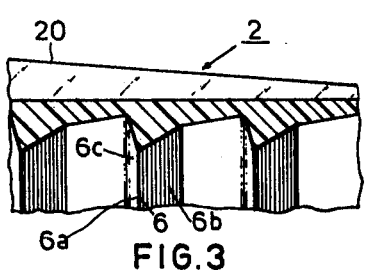
FIG. 3 is an enlarged sectional view illustrating the configuration of the internal teeth formed in the split-ring of FIG. 1.

FIG. 3 illustrates the structure of the internal teeth 6 to provide a better biting edge with respect to the pipe P. As shown in FIG. 3, the annular teeth 6 are formed with pointed edges 6a defined by a first face 6b at a large angle, preferably about 60°, to the transverse axis of the split-ring, and a second face 6c at a much smaller angle, preferably about 15°, to the transverse axis of the split-ring. This configuration has been found to minimize the deformation of the teeth when stripping the split-ring from the mold in which it is produced and also has been found to strengthen the teeth during use.

Figure 4:
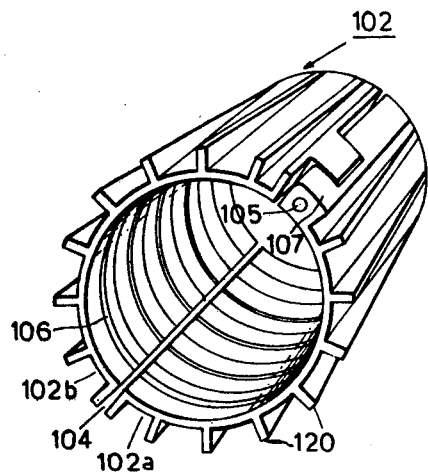
FIG. 4 is a perspective view of a modified split-ring described in the above-cited parent application.

FIG. 4 illustrates a variation in the split-ring, wherein it is constituted of two separate sections 102a and 102b hingedly connected together along one edge of each section. This hinged connection is provided by a pin 105 passing through apertured embossments 107 formed on the respective end of each of the two sections 102a and 102b of the split-ring 102. The opposite edges of the two sections constitute the split 104 comparable to the split 4 in FIG. 1. The split-ring 102 in FIG. 4 is otherwise substantially the same as described above with respect to FIG. 1, including the external ribs 120 (comparable to ribs 20) and the internal teeth 106 (comparable to teeth 6). It is used and applied in the same manner as described above since its hinged construction enables it likewise to be opened and applied radially to the pipe after the pipe has already been inserted into the bore of the coupling housing. The split-ring of FIG. 4 is particularly useful with very large-diameter pipes requiring even more elasticity in the split-ring than the construction of FIG. 1 to enable the radial application of the split-ring to the pipe after the pipe has already been introduced into the coupling housing with the aid of the threaded sleeve.

The longitudinal ribs formed on the outer face of the split-ring may extend for the complete length of the split-ring, as shown both in FIGS. 1 and 4, or they may extend for only a part of the length.

Figure 5:
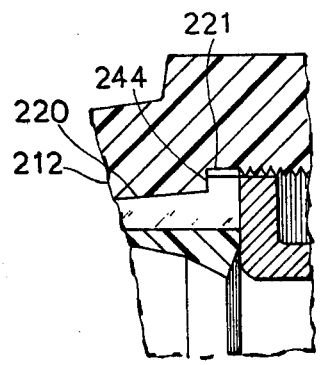
FIG. 5 is an enlarged fragmentary sectional view illustrating the improvement of the present application.

FIG. 5 illustrates the improvement of the present application.

In the improvement of FIG. 5, the higher end of each rib 220 is formed with a stepped outwardly-projecting shoulder 221, the annular array of shoulders of all the ribs thereby forming an annular bearing surface engageable by the internal shoulder 244 of sleeve 212. Whereas in the FIGS. 1–4 arrangements, a force tending to pull out the pipe from the coupling creates tensile stresses in the split-ring, in the FIG. 5 arrangement, wherein shoulders 221 of the split-ring ribs act against shoulder 244 of the sleeve 212, shear stresses are created instead, which stresses are better resisted by the split-ring than tensile stresses.

What is claimed is:

1. A pipe coupling comprising a housing formed with external threads and with an internal axial bore for receiving one end of a pipe; a split-ring of hard elastic material formed with annular teeth on its inner surface and a longitudinally-extending slit for application around the pipe to be received in the bore of the housing, said split-ring further including a plurality of circumferentially-spaced, axially-extending ribs of increasing height, the top lands of which ribs define an outer tapered surface on the split-ring, the higher end of each rib being formed with an outwardly-projecting step; and a sleeve formed at one end with threads cooperable with the threads of the housing, at the opposite end with an internal conical surface engageable with the outer tapered surface of the split-ring to cause the split-ring to tightly clamp the pipe upon threading the sleeve onto the housing, and with an intermediate internal annular shoulder engageable with said outwardly-projecting steps of the ribs.

2. A pipe coupling according to claim 1, wherein the split-ring is constituted of a unitary plastics member.

3. A pipe coupling according to claim 1, wherein the split-ring is constituted of two separate plastics sections hingedly connected together along one edge of each section.

* * * * *